US008920737B2

(12) United States Patent
Leininger

(10) Patent No.: US 8,920,737 B2
(45) Date of Patent: Dec. 30, 2014

(54) SYSTEM FOR CATALYTIC REACTION

(75) Inventor: Thomas Frederick Leininger, Chino Hills, CA (US)

(73) Assignee: General Electric Company, Schenectady, NY (US)

(*) Notice: Subject to any disclaimer, the term of this patent is extended or adjusted under 35 U.S.C. 154(b) by 227 days.

(21) Appl. No.: 13/560,961

(22) Filed: Jul. 27, 2012

(65) Prior Publication Data
US 2014/0030154 A1    Jan. 30, 2014

(51) Int. Cl.
*B01J 8/00* (2006.01)
*B01J 8/32* (2006.01)

(52) U.S. Cl.
USPC ............ 422/144; 422/145; 422/146; 422/619

(58) Field of Classification Search
CPC ...... C01B 3/16; C01B 3/18; C01B 2203/0425
USPC .......................................................... 422/619
See application file for complete search history.

(56) References Cited

U.S. PATENT DOCUMENTS

| | | | | |
|---|---|---|---|---|
| 4,084,545 | A * | 4/1978 | Nack et al. ..................... | 122/4 D |
| 5,034,132 | A * | 7/1991 | Miyakawa et al. ........... | 210/634 |
| 8,105,541 | B2 | 1/2012 | Stewart et al. | |
| 2008/0145156 | A1 | 6/2008 | Livingood et al. | |
| 2009/0178338 | A1 | 7/2009 | Leininger et al. | |
| 2010/0119419 | A1* | 5/2010 | Sprouse et al. ............... | 422/145 |
| 2010/0278702 | A1 | 11/2010 | Leininger et al. | |

FOREIGN PATENT DOCUMENTS

KR    20080095069    10/2008

OTHER PUBLICATIONS

Yi, et. al., Continuous Operation of the potassium-Based Dry Sorbent CO2 Capture Process with Two Fluidized-Bed Reactors, International Journal of Greenhouse Gas Control, 2007, pp. 31-36, vol. 1, Issue 1, Elsevier, http://www.mendeley.com/research/continuous-operation-potassium-based-dry-sorbent-co2-capture-process-two-fluidized-bed-reactors/.

Kim, Jong-Nam, Current Status of CCT & CCS R&D in Korea, NSW Low Emissions Coal Technologies Summit, Jun. 8, 2010, slide 28, http://www.dpi.nsw.gov.au/__data/assets/pdf_file/0020/343460/Kim__Current-status-of-CCT-and-CCS-R-and-D-in-Korea.pdf.

(Continued)

*Primary Examiner* — Lessanework Seifu
(74) *Attorney, Agent, or Firm* — Fletcher Yoder P.C.

(57) ABSTRACT

A system includes a reactor-adsorber configured to receive a gas, a regenerator configured to receive a saturated $CO_2$ adsorption material from the reactor-adsorber, a first solids pressurizing feeder configured to convey the saturated $CO_2$ adsorption material from the reactor-adsorber to the regenerator, and a second solids pressurizing feeder configured to convey a regenerated $CO_2$ adsorption material from the regenerator to the reactor-adsorber. The reactor-adsorber includes a catalyst material configured to catalyze a water gas shift reaction of the gas to generate a hydrogen-rich gas, and a $CO_2$ adsorption material configured to adsorb $CO_2$ from the hydrogen-rich gas to generate the saturated $CO_2$ adsorption material. The regenerator is configured to regenerate the saturated $CO_2$ adsorption material to provide the regenerated $CO_2$ adsorption material and $CO_2$. The first and second solids pressurizing feeders are configured to at least substantially reduce or prevent fluid flow between the reactor-adsorber and the regenerator.

21 Claims, 5 Drawing Sheets

(56) References Cited

OTHER PUBLICATIONS

Ryu, et. al., Reaction Characteristics of Two Water Gas Shift Catalysts in a Bubbling Fluidized Bed Reactor for SEWGS Process, 2010 ECI Conference on the 13th International Conference on Fluidization—New Paradigms in Fluidization Engineering, 2011, Paper 49, http://dc.engconfintl.org/fluidization_xiii/49/.

Ryu, et. al., Development of Novel two-Interconnected Fluidized Bed System, Korean Journal of Chemical Engineering, 2008, pp. 1178-1183, vol. 5 Issue 5.

Ryu, et. al., Solid Circulation Rate and Gas Leakage Measurements in an Interconnected Fluidized Beds, World Academy of Science, Engineering and Technology, 2007.

Ryu, et. al., Novel Two-Interconnected Fluidized Bed System for Selective Solid Circulation, 2010 ECI Conference on The 13th International Conference on Fluidization—New Paradigms in Fluidization Engineering 2011, Paper 63.

Yi, et al., Feasibility Test for CO2 Capture by Dry Sorbents in Two Fluidized Bed Reactors, Fourth Annual Conference on Carbon Capture and Sequestration, US DOE/NETL, May 2005.

Ryu, et. al., Development of Solid Separator for Selective Solid Circulation in Two-interconnected Fluidized Beds System, Korean Chemical Engineering Research, Apr. 2009, pp. 195-202, vol. 47, Issue No. 2.

Ryu, et. al., A Study on Two-interconnected Fluidized Beds System for Selective Solid Circulation, Korean Chemical Engineering Research, Jun. 2009, pp. 337-343, vol. 47, No. 3.

Ryu, et. al., Effects of Operating Variables on Solid Separation Rate in Two-interconnected Fluidized Beds System for Selective Solid Circulation, Korean Chemical Engineering Research, Jun. 2009, pp. 355-361, vol. 47, No. 3.

Ryu, Ho-Jung, Selection of Process Configuration and Operating Conditions for SEWGS System, Transactions of the Korean Hydrogen and New Energy Society, Apr. 2009, pp. 168-178, vol. 20, No. 2.

Ryu, et. al., Reaction Characteristics of WGS Catalyst with Fraction of Catalyst in a Batch Type Fluidized Bed Reactor, Transactions Of the Korean Hydrogen and New Energy Society, Aug. 2011, pp. 465-47, vol. 22, No. 4.

Ciferno, Jared, et. al., DOE/NETL Advanced Carbon Dioxide Capture R&D Program, Technology Update, Appendix B, Pre-Combustion Sorbents, May 2011.

Refinery Process Air Emissions, The McIlvaine Company, pp. 1-10 http://www.mcilvainecompany.com/brochures/refinery_process.htm, Last Accessed Mar. 20, 2013.

U.S. Appl. No. 13/560,957, filed Jul. 27, 2012, Leininger.

* cited by examiner

US 8,920,737 B2

SYSTEM FOR CATALYTIC REACTION

BACKGROUND OF THE INVENTION

The subject matter disclosed herein relates to catalytic reaction, and, more particularly, to catalytic generation of hydrogen and carbon dioxide.

Various industrial processes may be used for the generation of hydrogen and carbon dioxide. For example, an integrated gasification combined cycle (IGCC) power plant may produce a synthetic gas, or a syngas, which may include hydrogen, carbon monoxide, water, carbon dioxide, and other byproducts. The composition of the syngas may be altered by using a water gas shift reaction to produce additional hydrogen and carbon dioxide. In a separate process, the carbon dioxide may be separated from the hydrogen. Further, in another separate process, the carbon dioxide may be compressed for transport to a disposal site, to an enhanced oil recovery (EOR) field, or to another industrial process that uses carbon dioxide. Unfortunately, the production of hydrogen and carbon dioxide, and the separation and compression of carbon dioxide using such methods may be costly because of the high operational and equipment costs associated with using separate processes.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a reactor-adsorber configured to receive a gas. The reactor-adsorber includes a catalyst material configured to catalyze a water gas shift reaction of the gas to generate a hydrogen-rich gas, and a carbon dioxide ($CO_2$) adsorption material configured to adsorb $CO_2$ from the hydrogen-rich gas to generate a saturated $CO_2$ adsorption material. The system also includes a regenerator configured to receive the saturated $CO_2$ adsorption material from the reactor-adsorber. The regenerator is configured to regenerate the saturated $CO_2$ adsorption material to provide a regenerated $CO_2$ adsorption material and $CO_2$. The system also includes a first solids pressurizing feeder configured to convey the saturated $CO_2$ adsorption material from the reactor-adsorber to the regenerator and a second solids pressurizing feeder configured to convey the regenerated $CO_2$ adsorption material from the regenerator to the reactor-adsorber. The first and second solids pressurizing feeders are configured to at least substantially reduce or prevent fluid flow between the reactor-adsorber and the regenerator.

In a second embodiment, a system includes a first reactor configured to receive a first gaseous stream and generate a first solids stream. The first reactor includes a fluidized bed of catalyst particles and adsorption particles. The first solids stream includes a portion of the adsorption particles. The first reactor is configured to substantially retain the catalyst particles. The system also includes a second reactor configured to receive the first solids stream, receive a second gaseous stream, and generate a second solids stream. The system also includes a first solids pressurizing feeder configured to convey the first solids stream from the first reactor to the second reactor and a second solids pressurizing feeder configured to convey the second solids stream from the second reactor to the first reactor. The first and second solids pressurizing feeders are configured to at least substantially reduce or prevent fluid flow between the first reactor and the second reactor.

In a third embodiment, a system includes a reactor configured to receive a gaseous stream and generate a solids stream. The reactor includes a fluidized bed of catalyst particles and adsorption particles. The solids stream includes a portion of the adsorption particles. The reactor is configured to substantially retain the catalyst particles. The system also includes a solids pressurizing feeder configured to convey the solids stream away from the reactor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
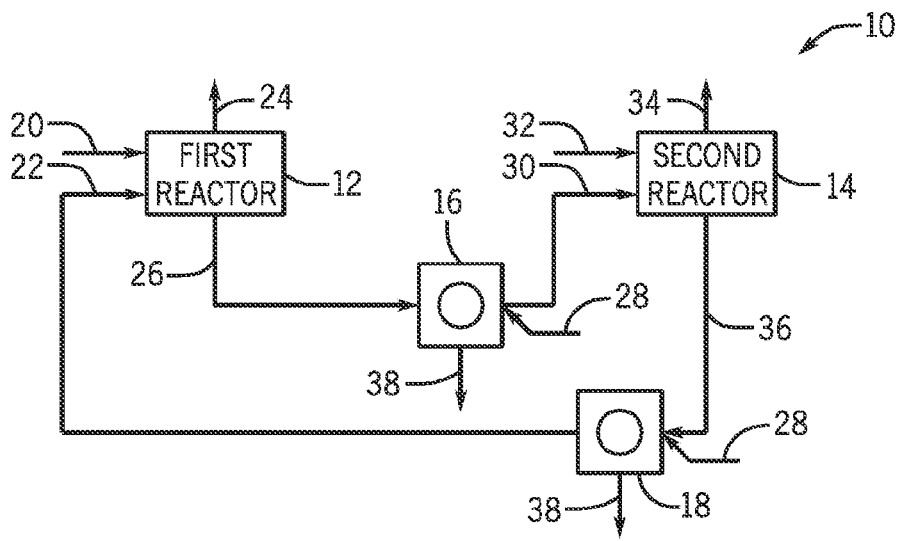
FIG. 1 is a schematic diagram of an embodiment of a multi-reactor system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide catalytic and adsorptive systems for generation of hydrogen and carbon dioxide. For example, a system may include a reactor-adsorber, a regenerator, a first solids pressurizing feeder, and a second solids pressurizing feeder. The reactor-adsorber may include a catalyst (e.g., catalyst particles) and a $CO_2$ adsorption material (e.g., $CO_2$ adsorption particles). In certain embodiments, the catalyst particles and the $CO_2$ adsorption particles may be disposed in a fluidized bed disposed in the reactor-adsorber. The reactor-adsorber may receive a gas, and the catalyst particles may catalyze a water gas shift reaction of the gas in the reactor-adsorber to generate a hydrogen-rich gas, which also includes $CO_2$. The $CO_2$ adsorption particles in the reactor-adsorber may adsorb $CO_2$ from the hydrogen-rich gas to generate saturated $CO_2$ adsorption particles. As used herein, the term "saturated $CO_2$ adsorption particles" includes adsorption particles that have been at least partially saturated and that may, in fact, consist primarily of adsorption particles that have only been partly saturated instead of fully saturated. The catalyst particles may remain in the reactor-adsorber and a portion of the saturated $CO_2$ adsorption particles may be transferred to the regenerator to be regenerated into regenerated adsorption particles and $CO_2$. As used herein, the term "regenerated $CO_2$ adsorption particles" includes adsorption particles that have been at least partially regenerated and that may, in fact, consist primarily of adsorption particles that have only been partly regenerated instead of fully regenerated. Thus, the reactor-adsorber produces hydrogen and the regenerator produces $CO_2$.

The first solids pressurizing feeder may convey the saturated $CO_2$ adsorption particles from the reactor-adsorber to the regenerator, and the second solids pressurizing feeder may convey the regenerated $CO_2$ adsorption particles from the regenerator to the reactor-adsorber. The first and second solids pressurizing feeders may substantially reduce or prevent fluid flow between the reactor-adsorber and the regenerator. Examples of fluids include liquids and gases. For example, the first solids pressurizing feeder may substantially reduce or prevent the hydrogen-rich gas from flowing to the regenerator. Similarly, the second solids pressurizing feeder may substantially reduce or prevent the $CO_2$ from flowing to the reactor-adsorber. By substantially reducing or preventing fluid flow between the reactor-adsorber and the regenerator, the first and second solids pressurizing feeders may help to prevent operational upsets associated with intermixing of different fluids between the reactor-adsorber and the regenerator. In addition, the first and second solids pressurizing feeders may provide a metered, unidirectional flow of solids in the direction of intended flow, for example, from the reactor-adsorber to the regenerator or from the regenerator to the reactor-adsorber. Furthermore, the first and second solids pressurizing feeders may enable the reactor-adsorber and the regenerator to operate at substantially different pressures, which may improve the efficiency and operational flexibility of the reactor-adsorber and the regenerator. For example, the first and second solids pressurizing feeders may enable the regenerator to operate at a higher pressure than the reactor-adsorber, which may improve the efficiency of the regenerator and which may reduce or eliminate the amount of compression energy required to produce the $CO_2$ stream at the final, high pressure typically required for pipeline transportation or by downstream industrial processes. Thus, use of the disclosed solids pressurizing feeders is particularly well-suited for use in coupled fluidized bed systems in which solids circulate between two or more beds, but gases between the beds remain separated. In conventional systems, two or more fluidized beds may be coupled together aerodynamically. That is, the solids are moved from one bed to another using vertical or sloped lines and gravity as a driving force. Alternatively, a carrier gas may be used to entrain the solids for transport from one bed to another. In such systems, both solids and gases are moved using small differences in pressure and, in fact, the pressure balance around the entire system is critical for successful operation. Pressure upsets caused by upstream or downstream equipment or processes can upset the sensitive pressure balance in such systems so that solids, gases, or both move in unwanted directions. In contrast, in systems that use solids pressurizing feeders such as the systems disclosed herein, pressure upsets originating in upstream or downstream equipment or processes may not disturb the flow of solids or gases. The solids pressurizing feeders may help provide positive, metered, unidirectional flow of solids in the intended direction of flow and provide a means to substantially reduce or prevent unwanted fluid flow between coupled fluidized beds.

FIG. 1 is a schematic diagram of an embodiment of a system 10 with reactors 12 and 14 that employ a first solids pressurizing feeder 16 and a second solids pressurizing feeder 18 to convey solids against a pressure gradient. In other words, the first and second solids pressurizing feeders 16 and 18 may convey solids from an area at a first pressure to an area at a second pressure that is higher than the first pressure. In the following discussion, various streams may be referred to by the phase of the primary components of the stream (e.g., a solids stream). However, any of the following streams may also contain other phases (e.g., the solids stream may include liquids and/or gases). The system 10 includes a first reactor 12 and a second reactor 14. One or both of the first and second reactors 12 and 14 may be fluidized bed reactors, or any other type of reactor in which multiphase chemical reactions occur, such as moving bed reactors, bubbling bed reactors, transport reactors, and so forth. Specific examples of such systems are described in detail below. As shown in FIG. 1, the first reactor 12 receives a first gaseous inlet stream 20 and a first solids inlet stream 22. A chemical reaction may occur in the first reactor 12, generating a first gaseous outlet stream 24 and a first solids outlet stream 26. The first solids outlet stream 26 is conveyed to the second reactor 14 using the first solids pressurizing feeder 16. In certain embodiments, the first solids pressurizing feeder 16 may include the injection of an inert buffer gas 28 at the exit of the feeder 16, as described in detail below. The inert buffer gas 28 may help to provide a barrier against intermixing of gases between the first and second reactors 12 and 14. A portion of the inert buffer gas 28 flows with an outlet stream 30 and may assist with the conveyance of the outlet stream 30 to the second reactor 14, while the remainder enters the first solids pressurizing feeder 16. As described in more detail below, the remainder of the inert buffer gas 28 that enters the first solids pressurizing feeder 16 collects in the body of the feeder 16 and forms a vent stream 38 that exits the body of the feeder 16. The vent stream 38 may be recycled for use as the inert buffer gas 28 or may be disposed of in a suitable manner. The flow rate of the portion of inert buffer gas that 28 enters the first solids pressurizing feeder 16 is limited by the particle size distribution, the particle packing of the solids being conveyed by the feeder 16, and the pressure gradient across the packed column of solids developed by the first solids pressurizing feeder 16. Increases in the flow rate of the inert buffer gas 28 beyond a certain minimum value tend to increase the portion of the buffer gas 28 that flows with the solids in the outlet stream 30 rather than increasing the portion of the buffer gas 28 that forms the vent stream 38. In an alternative embodiment, the flow rate of the inert buffer gas 28 may be increased in order to increase the portion of buffer gas 28 flowing with the solids in the outlet stream 30 in order to enhance the conveyance of solids to the second reactor 14. In another alternative embodiment, a second flow of gas (not shown) may be injected into the outlet stream 30 immediately downstream of the injection point for buffer gas 28 in order to provide additional conveying gas for the solids in the outlet stream 30. This additional conveying gas may be an inert gas, such as nitrogen, or it may be a process gas, such as the gas in the second reactor 14.

The outlet stream 30, which may contain a portion of the inert buffer gas stream 28 in addition to the first solids outlet stream 26, enters the second reactor 14. In addition, the second reactor 14 may receive a second gaseous inlet stream 32. A chemical reaction may occur in the second reactor 14, which may generate a second gaseous outlet stream 34 and a second solids outlet stream 36. The second solids outlet stream 36 is conveyed to the first reactor 12 using the second solids pressurizing feeder 18. In certain embodiments, the second solids pressurizing feeder 18 may also include the injection of the inert buffer gas 28 at the entrance of the feeder 18. The inert buffer gas 28 may help to provide a barrier against intermixing of gases between the second and first reactors 14 and 12. A portion of the inert buffer gas 28 flows with the solids entering solids pressurizing feeder 18, while the remainder flows upstream towards the second reactor 14. The portion of the buffer gas 28 that enters the second solids pressurizing feeder 18 along with the second solids outlet stream 36 collects in the body of the feeder 18 and forms the vent stream 38 that exits the body of the feeder 18. The vent stream 38 may be recycled for use as inert buffer gas 28 or may be disposed of in a suitable manner. The flow rate of the portion of the inert buffer gas 28 that enters the second solids pressurizing feeder 18 is limited by the particle size distribution, the particle packing of the solids being conveyed by the feeder 18, and the pressure gradient across the packed column of solids developed by the second solids pressurizing feeder 18. Increases in the flow rate of the inert buffer gas 28 beyond a certain minimum value tend to increase the portion of the buffer gas 28 that flows backwards towards the second reactor 14 against the flow of the second solids outlet stream 36. Therefore, in certain embodiments, the flow rate of the inert buffer gas 28 injected into the entrance of the second solids pressurizing feeder 18 is minimized in order to minimize the portion of the buffer gas 28 flowing upstream towards second reactor 14. The second solids pressurizing feeder 18 conveys the first solids inlet stream 22, which may be essentially the same as the second solids outlet stream 36, to the first reactor 12. In an alternative embodiment, a second flow of gas (not shown) may be injected into the outlet of the second solids pressurizing feeder 18 in order to provide conveying gas for the solids in the first solids inlet stream 22. The first and second solids pressurizing feeders 16 and 18 substantially reduce or prevent fluid flow (e.g., gas or liquid flow) between the first and second reactors 12 and 14. In further embodiments, the first and second reactors 12 and 14 may include additional inlet and outlet streams, which may include various solids, liquids, and/or gases.

By using the first and second solids pressurizing feeders 16 and 18 to substantially reduce or prevent fluid flow between the first and second reactors 12 and 14 in FIG. 1, the operating pressures of the first and second reactors 12 and 14 may be substantially different from one another, rather than operating the first and second reactors 12 and 14 at approximately the same pressures. For example, the operating pressure of the second reactor 14 may be substantially higher than the operating pressure of the first reactor 12. For example, a ratio of a pressure of the second reactor 14 to a pressure of the first reactor 12 may be between approximately 1:1 to 10.0:1, 1.5:1 to 3.0:1, or 2.0:1 to 2.5:1. In other embodiments, the operating pressure of the first reactor 12 may be substantially higher than the operating pressure of the second reactor 14. For example, a ratio of a pressure of the first reactor 12 to a pressure of the second reactor 14 may be between approximately 1:1 to 10:1, 1.5:1 to 3.0:1, or 2.0:1 to 2.5:1. In further embodiments, the first and second solids pressurizing feeders 16 and 18 also enable the operating pressures of the first and second reactors 12 and 14 to be approximately the same.

Furthermore, the substantial reduction or prevention by the first and second solids pressurizing feeders 16 and 18 of fluid flow between the first and second reactors 12 and 14 helps to substantially reduce or prevent intermixing of the gaseous streams of the system 10 that may occur during process transients, such as startups and shutdowns. For example, the first solids pressurizing feeder 16 may help to reduce or prevent the first gaseous inlet stream 20 and the first gaseous outlet stream 24 from flowing into the second reactor 14. The first solids pressurizing feeder 16 may also help to reduce or prevent the second gaseous inlet stream 32 and the second gaseous outlet stream 34 from flowing into the first reactor 12. The second solids pressurizing feeder 18 may also help reduce or prevent intermixing of the gaseous streams between the reactors 12 and 14. Thus, by using the first and second solids pressurizing feeders 16 and 18, any undesirable consequences of intermixing of the gaseous streams in the system 10 may be avoided. Furthermore, the use of the first and second solids pressurizing feeders 16 and 18 enables a much more robust control over the circulation of solids through system 10 than would be the case if system 10 were configured using conventional aerodynamically coupled reactors, that is, a system that relied on gravity, density differences of fluidized solids, and precise control over small pressure differences in order to regulate the flow of solids and gases through the system. By using the first and second solids pressurizing feeders 16 and 18 to regulate the circulation of solids through system 10, the circulation of the solids through the system is unaffected by process transients, such as startups and shutdowns. The first and second solids pressurizing feeders 16 and 18 may also enable the flow rates of solids to be more easily adjusted and precisely metered compared with conventional aerodynamically coupled reactors. In further embodiments, the system 10 may include additional reactors and/or additional solids pressurizing feeders. Further, the arrangement of the streams, the reactors, and/or the solids pressurizing feeders may be different in such embodiments.

In certain embodiments, the first reactor 12 may be a reactor-adsorber and the second reactor 14 may be a regenerator. For example, the reactor-adsorber may include a catalyst to catalyze a chemical reaction. The reactor-adsorber may also include an adsorption material that adsorbs a product of the chemical reaction. Thus, both a chemical reaction and an adsorption process occur in the first reactor 12. The adsorption material may become less effective, or saturated, as it continues to adsorb the product of the chemical reaction. Thus, a portion of the saturated adsorption material may be transferred from the first reactor 12 to the second reactor 14 using the first solids pressurizing feeder 16 to be regenerated. The saturated adsorption material may be regenerated in the second reactor 14 by heating, by changing the total pressure, by changing the partial pressure of the product adsorbed on the adsorption material or by exposure to another material. The regenerated adsorption material from the second reactor 14 may then be transferred to the first reactor 12 using the second solids pressurizing feeder 18 to be used to adsorb the product of the chemical reaction.

Figure 2:
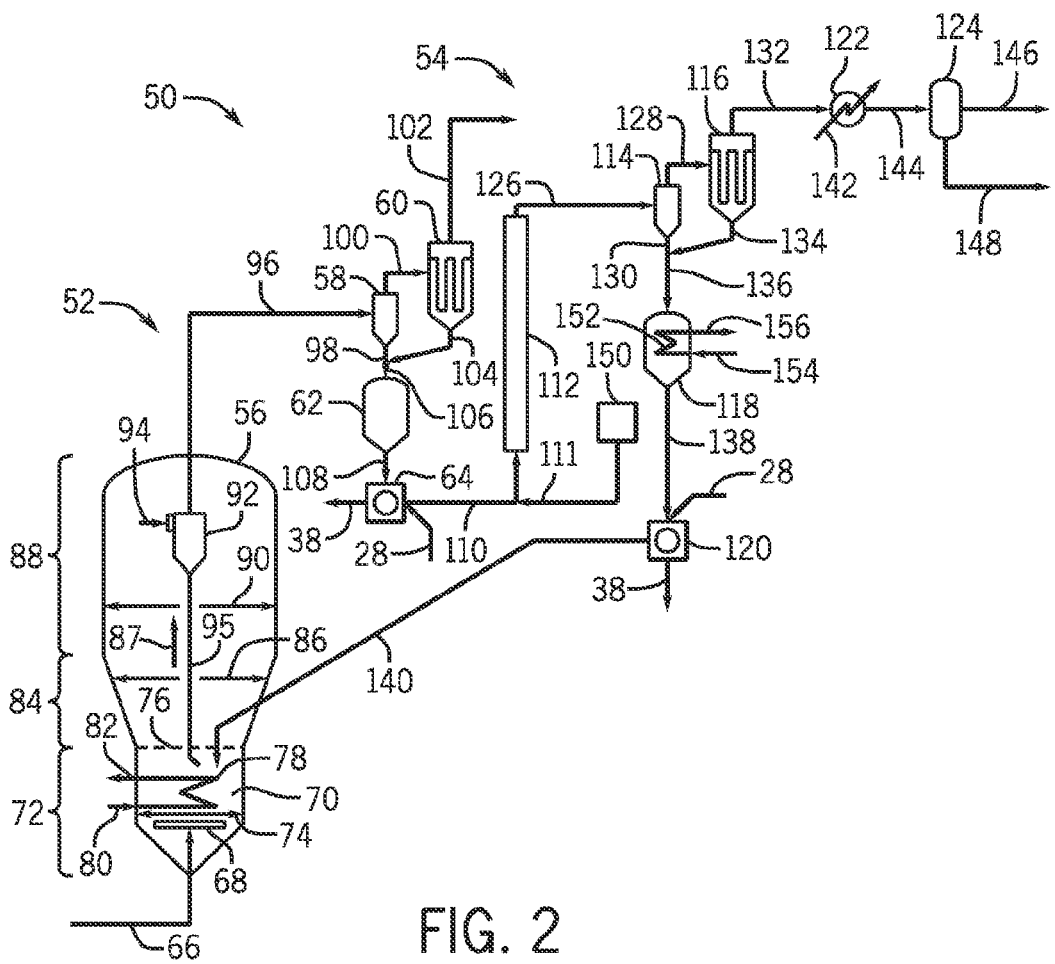
FIG. 2 is a schematic diagram of an embodiment of a combined water gas shift-$CO_2$ capture and pressurization system.

FIG. 2 is a schematic diagram of an embodiment of a hydrogen and $CO_2$ generation system 50 that employs solids pressurizing feeders as discussed above. The hydrogen and $CO_2$ generation system 50 includes a reaction system 52 and regeneration system 54. Turning to the reaction system 52 in more detail, the system 52 includes a reactor-adsorber 56 (e.g., catalyst and $CO_2$ adsorption particles), a cyclone 58, a filter 60, an accumulator 62, and a first solids pressurizing feeder 64. Together, the cyclone 58 and the filter 60 may be referred to as a separation system. The reactor-adsorber 56 includes an interior chamber in which a fluidized bed reactor is disposed to treat a raw synthesis gas stream 66, which may be generated by a gasifier. Synthesis gas may also be referred to as syngas. In other embodiments, the gas stream 66 may include fuel gas, producer gas, coke oven gas, pyrolysis gas, town gas, bio-syngas, other manufactured gases, or a combination thereof. The raw syngas stream 66 may include a variety of gases including, but not limited to, carbon monoxide, hydrogen, $CO_2$, steam, methane, nitrogen, argon, carbonyl sulfide, hydrogen sulfide, and combinations thereof. In some embodiments, the raw syngas stream 66 may also include unreacted fuel from the gasifier. In certain embodiments, the raw syngas 66 may optionally pass through a scrubber, which remove particulates, and/or other systems to remove other components from the raw syngas 66. For example, depending on the tolerance of the water gas shift catalyst and the $CO_2$ adsorption particles to sulfur, the raw syngas 66 may be desulfurized prior to introduction to the reactor-adsorber 56.

As shown in FIG. 2, the raw syngas stream 66 enters the reactor-adsorber 56 and passes through a syngas distributor 68, which may include one or more holes to help provide uniform distribution of the raw syngas 66 in a fluidized bed 70. The fluidized bed 70 is located in a lower portion 72 of the reactor-adsorber 56 and may include catalyst particles and the $CO_2$ adsorption particles, as discussed in detail below. The raw syngas 66 may be converted into a reacted syngas (e.g., syngas in which CO has been converted into $CO_2$ and the $CO_2$ removed using the CO2 adsorption particles) as a result of the water gas shift reaction that occurs in the fluidized bed 70. In other embodiments, the catalyst particles may be fixed within a fixed-bed reactor. The lower portion 72 of the reactor-adsorber 56 may be characterized by a lower portion diameter 74. In addition, a top 76 of the fluidized bed 70 may also define a top of the lower portion 72. As described in detail below, most or all of the catalyst particles may be confined to the area of the lower portion 72 below the top 76 of the fluidized bed 70. In certain embodiments, the fluidized bed 70 may include a heat exchanger 78, which may be in the shape of a coil. In other embodiments, the heat exchanger 78 may include a plurality of vertically-oriented cooling tubes joined at the bottom by a first coolant tube manifold and at the top by a second coolant tube manifold. A heat transfer fluid 80, such as boiler feed water, may enter the heat exchanger 78 and absorb heat generated in the fluidized bed 70. A heated heat transfer fluid 82, such as steam, may exit from the heat exchanger 78 after absorbing the heat generated in the fluidized bed 70. As described in detail below, the reactions occurring in the fluidized bed 70 may be exothermic; therefore, the heat exchanger 78 may be useful for removing the heat of reaction and preventing overheating of the lower portion 72. In addition, the combination of the heat exchanger 78 and the fluidized bed 70 may facilitate temperature control and heat management of the lower portion 72.

A middle portion 84 of the reactor-adsorber 56 may be located above the lower portion 72. The middle portion 84 may be characterized by a middle portion diameter 86, which may be greater than the lower portion diameter 74. In certain embodiments, the middle portion diameter 86 may gradually increase in the direction of flow 87 through the reactor-adsorber 56. In other words, the middle portion 84 may have a tapered, angled, or expanding cross-sectional shape. A gradually increasing middle portion diameter 86 may enable a smoother transition between the lower portion 72 and an upper portion 88 of the reactor-adsorber 56. In addition, a gradually increasing middle portion diameter 86 may help prevent solids from accumulating on the inner walls of the reactor-adsorber 56. In other words, solids may be less likely to accumulate on a sloping surface than a sharply angled or horizontal surface. In the middle portion 84, the reacted syngas flows upward in the direction of flow 87 and carries along a portion of the $CO_2$ adsorption particles.

The upper portion 88 of the reactor-adsorber 56 is characterized by an upper portion diameter 90, which may be greater than the middle portion diameter 86 and the lower portion diameter 74. The increase in diameter of the reactor-adsorber from the lower portion 72 to the upper portion 88 may cause a decrease in gas flow velocity in the direction of flow 87. In other words, as the cross-sectional area of the reactor-adsorber 56 increases, or expands, the gas flow velocity decreases to a level insufficient to carry the catalyst particles, yet still sufficient to carry the $CO_2$ adsorption particles out of the reactor-adsorber 56. For example, the gas flow velocity may decrease by approximately 10% to 90%, 25% to 75%, or 35% to 65% between the lower portion 72 and the upper portion 88. As discussed in detail below, a diameter or a density of the catalyst particles may be greater than a diameter or a density of the $CO_2$ adsorption particles, or a drag coefficient of the catalyst particles may be less than a drag coefficient of the $CO_2$ adsorption particles. Thus, the decrease in gas flow velocity may help enable any catalyst particles that escape the fluidized bed 70 to fall back into the lower portion 72. However, because of the smaller diameter, lower density, and/or higher drag coefficient of the $CO_2$ adsorption particles, the particles may be carried along in the direction of flow 87 toward a catalyst return cyclone 92, which separates catalyst particles from gases and $CO_2$ adsorption particles and serves as a final guard against catalyst particles escaping from the reactor-adsorber 56. Specifically, the catalyst return cyclone 92 may remove the denser catalyst particles from the gases and the $CO_2$ adsorption particles through vortex separation. In other words, the catalyst return cyclone 92 may be configured such that the rotational effects inside the cyclone preferentially separate the catalyst particles from the gases and the $CO_2$ adsorption particles entrained within the gases. In further embodiments, other methods of separating solids from gases may be used instead of the catalyst return cyclone 92. In still further embodiments, the catalyst return cyclone 92 may be eliminated and the decrease in upwards flow velocity inside the reactor-adsorber 56 may be solely relied upon as the means to confine the catalyst particles to the fluidized bed 70. As shown in FIG. 2, a mixed stream 94, which may include the reacted syngas, a portion of the $CO_2$ adsorption particles, and a small amount of the catalyst particles, enters the catalyst return cyclone 92. Exiting the bottom of the catalyst return cyclone 92 is a solids stream 95, which may include the small amount of catalyst particles. Exiting the top of the catalyst return cyclone 92 is a reactor-adsorber product stream 96 that includes the reacted syngas and the entrained $CO_2$ adsorption particles, which is then sent to the cyclone 58. The solids stream 95 is returned to the fluidized bed 70. In other embodiments, the catalyst return cyclone 92 may be omitted or replaced with a different separations device.

The reactor-adsorber outlet stream 96 from the catalyst return cyclone 92 includes the $CO_2$ adsorption particles and thus, the cyclone 58 is used to remove the $CO_2$ adsorption particles from the outlet stream 96 through vortex separation. In further embodiments, other methods of separating solids from gases may be used instead of the cyclone 58. Exiting the bottom of the cyclone 58 are saturated CO$_2$ adsorption particles 98, and exiting the top of the cyclone 58 is a cyclone gaseous stream 100 which is then sent to the filter 60. The cyclone gaseous stream 100 may contain some solids and thus, the filter 60 is used to remove any remaining CO$_2$ adsorption particles from the gaseous stream 100 using filtration. In other embodiments, the filter 60 may be another cyclone or any other type of solid-gas separation device. Exiting the top of the filter 60 is a hydrogen-rich gas 102, which may be substantially free of CO$_2$. In certain embodiments, substantially free of CO$_2$ may correspond with a CO$_2$ level of less than 10%, 5%, 2%, or 1% by volume. The hydrogen-rich gas 102 may be used in a variety of applications. For example, the hydrogen-rich gas 102 may be used in industrial processes, such as, but not limited to, hydro-refining, ammonia production, and so forth. The hydrogen rich gas 102 may also be used as a fuel gas for a combustion turbine. Leaving the bottom of the filter 60 are additional saturated CO$_2$ adsorption particles 104. The saturated CO$_2$ adsorption particles 98 from the CO$_2$ sorbent cyclone 58 and the additional saturated CO$_2$ adsorption particles 104 from the filter 60 may combine to form a combined saturated CO$_2$ adsorption particles stream 106 that is regenerated in the regeneration system 54.

In certain embodiments, the combined saturated CO$_2$ adsorption particles stream 106 enters the accumulator 62, which may be a vessel used to provide hold up capacity for a continuous saturated CO$_2$ adsorption particles stream 108 being fed to the first solids pressurizing feeder 64. In other words, the accumulator 62 stores the combined saturated CO$_2$ adsorption particles stream 106 to enable the continuous saturated CO$_2$ adsorption particles stream 108 to be fed to the first solids pressurizing feeder 64 despite fluctuations of the combined saturated CO$_2$ adsorption particles stream 106. In certain embodiments, the accumulator 62 may include a purge gas introduced near the bottom of the accumulator 62 to fluidize the combined saturated CO$_2$ adsorption particles stream 106 to help with stripping of any remaining gases. For example, the purge gas may be an inert gas, such as nitrogen. The first solids pressurizing feeder 64 may include the inert buffer gas 28, as described in detail below. The first solids pressurizing feeder 64 conveys saturated CO$_2$ adsorption particles 110 to the regeneration system 54.

The regeneration system 54 shown in FIG. 2 includes a regenerator 112, a cyclone 114, a filter 116, an accumulator 118, a second solids pressurizing feeder 120, a steam condenser 122, a condensate knockout pot 124, and a regeneration gas source 150 that operates at a pressure at or above the pressure of the regenerator 112. As with the reaction system 52, the cyclone 114 and the filter 116 may be referred to together as a separation system. The regenerator 112 may be a transport reactor that uses a regeneration gas 111 from the regeneration gas source 150 to regenerate the saturated CO$_2$ adsorption particles 110, i.e., remove CO$_2$ from the saturated CO$_2$ adsorption particles 110. In an alternative embodiment, the regenerator 112 may be a bubbling fluidized bed reactor or any other type of fluidized bed reactor that is suitable for regenerating the saturated CO$_2$ adsorption particles 110. Specifically, the regenerator 112 may bring the saturated CO$_2$ adsorption particles 110 in contact with the regeneration gas 111, or high temperature gas that includes, but is not limited to, superheated steam, nitrogen, process gas, combustion gas, or a combination thereof. In certain embodiments, the CO$_2$ adsorption particles may be lithium orthosilicate (Li$_4$SiO$_4$). In such embodiments, the saturated CO$_2$ adsorption particles 110 may be regenerated in the regenerator 112 via the following reaction:

$$\text{Li}_2\text{CO}_3 + \text{Li}_2\text{SiO}_3 + \text{heat} \Longleftrightarrow \text{Li}_4\text{SiO}_4 \times \text{CO}_2 \qquad \text{(EQUATION 1)}$$

in which Li$_2$CO$_3$ represents lithium carbonate, Li$_2$SiO$_3$ represents lithium metasilicate, and heat represents the heat introduced into the regenerator 112 by the regeneration gas 111. In such embodiments, the regeneration gas source 150 may be a dedicated boiler that produces high-pressure, high-temperature superheated steam. Alternatively, the regeneration gas source 150 may be a heat exchanger elsewhere in the plant that generates high-pressure, high-temperature superheated steam. In a further alternative, the regeneration gas source 150 may be high-pressure combustor in which a slipstream of clean fuel is combusted with oxygen to produce a stream of high-pressure, high-temperature superheated steam. In such cases, the clean fuel may be a slipstream of hydrogen from the gasification plant that is further compressed up to the operating pressure of the regeneration gas source 150 or it may be clean liquid fuel that is pumped up to the operating pressure of the regeneration gas source 150. The oxygen may be gaseous oxygen that is compressed or liquid oxygen that is pumped up to the operating pressure of the regeneration gas source 150. In the foregoing embodiments involving the regeneration of lithium-based saturated CO$_2$ adsorption particles, the temperature of the regeneration gas 111 may be between approximately 400 to 820 degrees Celsius, 450 to 700 degrees Celsius, or 500 to 600 degrees Celsius. Thus, CO$_2$ is released from the saturated CO$_2$ adsorption particles (Li$_2$CO$_3$ and Li$_2$SiO$_3$) in the regenerator 112 to produce regenerated adsorption particles (Li$_4$SiO$_4$) that may be reused to adsorb additional CO$_2$. In an alternative embodiment, the CO$_2$ adsorption particles may be mesoporous carbon particles grafted with surface functional groups that remove CO$_2$ via physical adsorption. Such particles may be regenerated by increasing the temperature of the particles, by reducing the total pressure of the regenerator 112, by reducing the CO$_2$ partial pressure of the regeneration gas 111, or by a combination thereof. For example, the regenerator 112 may be operated at a pressure that is from approximately 0.2 to 1.0 times (e.g., less than approximately 0.5 times) the pressure of the reactor adsorber 56 and the source of regeneration gas 150 may supply a stream of superheated steam that is at the same temperature of the stream of saturated CO$_2$ adsorption particles 110, but which exposes the particles both to lower total pressure and a CO$_2$ partial pressure equal to zero. Thus, the CO$_2$ is released from the mesoporous carbon particles because of the lower CO$_2$ partial pressure as well as the lower total pressure. The regenerator outlet stream 126, which includes the regenerated CO$_2$ adsorption particles, CO$_2$, and spent regeneration gas, is then transferred to the cyclone 114. In other embodiments, the saturated CO$_2$ adsorption particles 110 may be indirectly heated in a bubbling bed reactor without coming in direct contact with the regeneration gas 111.

In the cyclone 114, the regenerated CO$_2$ adsorption particles are separated from the CO$_2$ and the spent regeneration gas through vortex separation. In further embodiments, other methods of separating solids from gases may be used instead of the cyclone 114. Regenerated CO$_2$ adsorption particles 130 exit the bottom of the cyclone 114 and a cyclone outlet stream 128 exits the top of the cyclone 114. The filter 116 is used to remove any remaining solids from the cyclone outlet stream 128 using filtration. In other embodiments, the filter 116 may use cyclonic separation or any other method of gas-solids separation. Exiting the top of the filter 116 is a CO$_2$ rich stream 132, which may also include the spent regeneration gas.

Exiting the bottom of the filter 116 are additional regenerated CO$_2$ adsorption particles 134. The regenerated CO$_2$ adsorption particles 130 from the cyclone 114 and the additional regenerated $CO_2$ adsorption particles 134 from the filter 116 combine to form a combined regenerated $CO_2$ adsorption particles stream 136, which enters the accumulator 118. The accumulator 118 may be a vessel used to provide hold up capacity for a continuous regenerated $CO_2$ adsorption particles stream 138 to be fed to the second solids pressurizing feeder 120. In other words, the accumulator 118 stores the combined regenerated $CO_2$ adsorption particles stream 136 to enable the continuous regenerated $CO_2$ adsorption particles stream 138 to be fed to the second solids pressurizing feeder 120 despite fluctuations of the combined regenerated $CO_2$ adsorption particles stream 136. In certain embodiments, the accumulator 118 may include a purge gas introduced near the bottom of the accumulator 118 to fluidize the combined regenerated $CO_2$ adsorption particles stream 136 to help with stripping of any remaining gases. For example, the purged gas may be an inert gas, such as nitrogen. In other embodiments, the accumulator 118 may include a heat exchanger 152, which may be in the shape of a coil. In still other embodiments, the heat exchanger 152 may consist of a plurality of vertically-oriented cooling tubes joined at the bottom by a first coolant tube manifold and at the top by a second coolant tube manifold. A heat transfer fluid 154, such as boiler feed water, may enter the heat exchanger 152 and absorb excess heat from the combined regenerated $CO_2$ adsorption particles stream 136. A heated heat transfer fluid 156, such as steam, may exit from the heat exchanger 152 after absorbing the excess heat from the combined regenerated $CO_2$ adsorption particles stream 136. As described in detail above, the temperature in the regenerator 112 may be significantly higher than the temperature in the reactor-adsorber 56, and so the heat exchanger 152 may be used to cool the combined regenerated $CO_2$ adsorption particles stream 136 before it is returned to the reactor-adsorber 56, thereby preventing overheating of the reactor-adsorber 56. The second solids pressuring feeder 120 may include the inert buffer gas 28, as described in detail below. The second solids pressurizing feeder 120 then conveys regenerated $CO_2$ adsorption particles 140 to the reaction system 52. Specifically, the regenerated $CO_2$ adsorption particles 140 may enter the middle portion 84 of the reactor-adsorber 56 and then fall or be directed into the fluidized bed 70 of the lower portion 72. Alternatively, the regenerated adsorption particles 140 may enter at the bottom of the fluidized bed 70. In other embodiments where the water gas shift catalyst may be incorporated into a monolithic structure containing numerous small diameter, parallel channels, the regenerated $CO_2$ adsorption particles 140 may enter towards the bottom of the lower portion 72 of the reactor-absorber 56 so that the regenerated $CO_2$ adsorption particles 140 can enter the channels of the catalyst laden monolith along with the raw syngas 66.

In certain embodiments where the regeneration gas 111 is steam, the $CO_2$ rich stream 132 may be directed to the steam condenser 122, which may be a heat exchanger. A heat transfer fluid 142, such as cooling water, may flow through one side of the steam condenser 122 to remove heat from the $CO_2$ rich stream 132, thereby condensing the steam into water, or condensate. A wet $CO_2$ rich stream 144 from the steam condenser 122 may then be directed to the steam condensate knockout pot 124, which may separate the wet $CO_2$ rich stream 144 into a dry $CO_2$ stream 146 and a condensate stream 148. The knockout pot 124, which may also be referred to as a vapor-liquid separator, uses gravity and/or inertial forces to cause the water in the wet $CO_2$ rich stream 144 to settle to the bottom of the knockout pot 124. The $CO_2$ travels upward through the knockout pot 124 at a design velocity to minimize entrainment of any liquid droplets as it exits the top of the knockout pot 124. In certain embodiments, the knockout pot 124 may contain a demister or similar device at the point where $CO_2$ exits the vessel in order to enhance the vapor-liquid separation efficiency. The dry $CO_2$ 146 may be used elsewhere in the plant (e.g., integrated gasification combined cycle (IGCC) power plant), transported off-site, disposed of, used for enhanced oil recovery, used for industrial manufacturing purposes or sequestered via injection into a suitable geological formation or deep below the surface of the ocean, for example. The condensate 148 may be reused elsewhere in the plant (e.g., IGCC power plant) to generate steam, for example. In certain embodiments, use of the dry $CO_2$ 146 may be facilitated if the dry $CO_2$ 146 is at a high pressure. For example, in certain embodiments, the pressure of the dry $CO_2$ 146 generated by the hydrogen and $CO_2$ generation system 50 may be between approximately 2800 kPa to 20700 kPa, 4200 kPa to 19000 kPa, or 7000 kPa to 17200 kPa. In one embodiment, the pressure of the dry $CO_2$ may be greater than approximately 2800 kPa. Thus, the dry $CO_2$ 146 may be transported to where high pressure and/or compressed $CO_2$ is used without having to separately compress or increase the pressure of the dry $CO_2$ 146, thereby reducing operational and/or equipment expenses associated with high-pressure $CO_2$ compression equipment. Use of the first and second solids pressurizing feeders 64 and 120 may enable the regeneration system 54 to operate at such high pressures, without having to operate the reaction system 52 at similar pressures that may be inefficient for the reaction system 52. In other words, the first and second solids pressurizing feeders 64 and 120 may at least substantially reduce or prevent fluid flow between the reactor-adsorber 56 and the regenerator 112, such that the pressure of the reactor-adsorber 56 is different from the pressure of the regenerator 112. For example, a ratio of the pressure of the regenerator 112 to the pressure of the reactor-adsorber 56 may be between approximately 1.1:1 to 10:1, 1.5:1 to 3.0:1, or 2.0:1 to 2.5:1. In one embodiment, the ratio of the pressure of the regenerator 112 to the pressure of the reactor-adsorber 56 may be greater than approximately 2:1.

Figure 3:
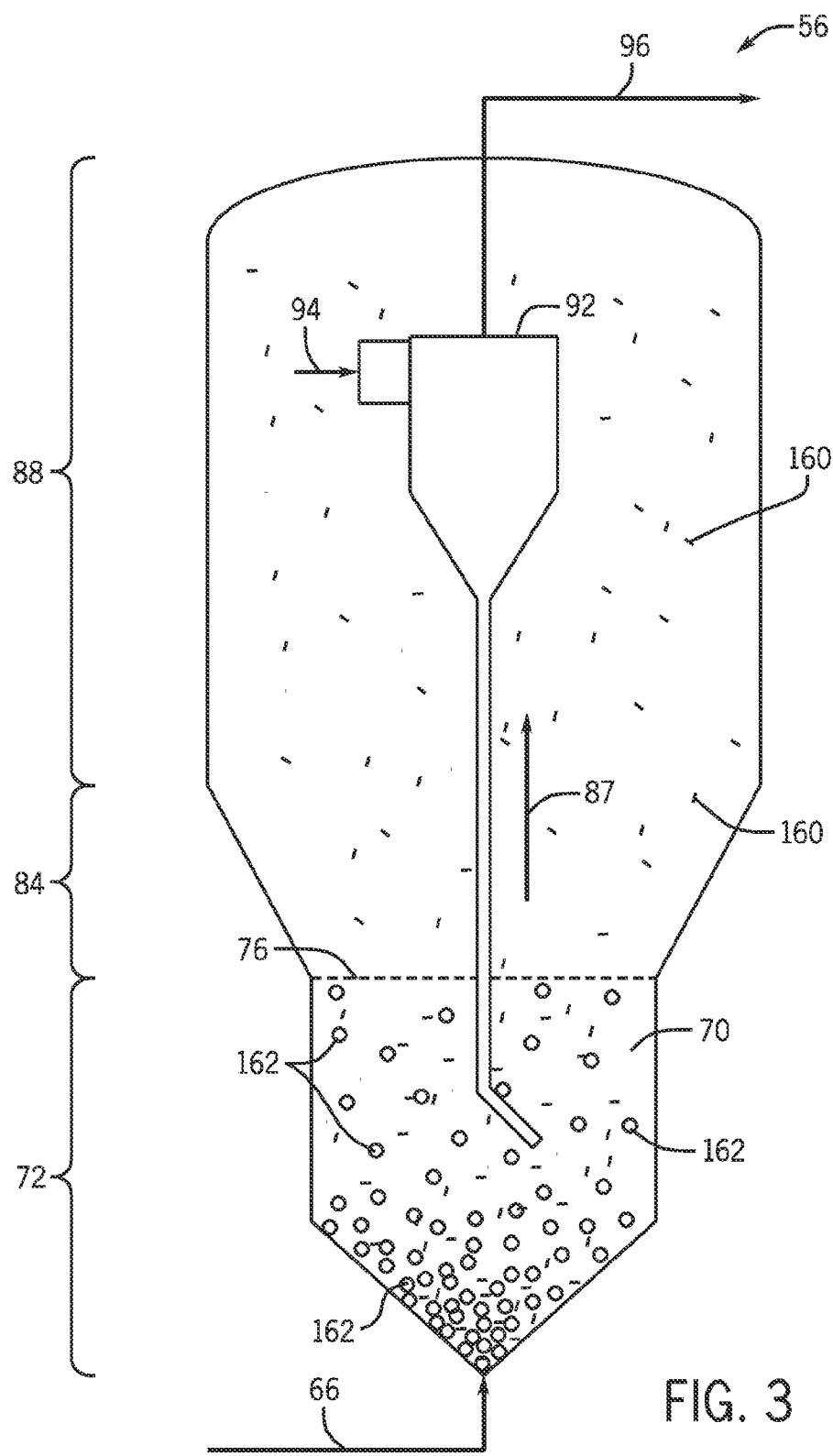
FIG. 3 is a schematic diagram of an embodiment of a reactor-adsorber.

FIG. 3 is schematic diagram of an embodiment of the reactor-adsorber 56 that may be used in the hydrogen and $CO_2$ generation system 50. As illustrated in FIG. 3, the fluidized bed 70 includes $CO_2$ adsorption particles 160 and catalyst particles 162. The $CO_2$ adsorption particles 160 may be in the form of a powder, granules, grains, agglomerations, and so forth. In the illustrated embodiment, the catalyst particles 162 are larger than the $CO_2$ adsorption particles 160. For example, a ratio of a size of the catalyst particles 162 to a size of the $CO_2$ adsorption particles 160 may be between approximately 1.1:1 to 1000:1, 10:1 to 100:1, or 25:1 to 75:1. Thus, the upward flow of the reacted syngas in the direction of flow 87 is more likely to carry the $CO_2$ adsorption particles 160 toward the catalyst return cyclone 92 than the catalyst particles 162. Thus, more of the catalyst particles 162 may be found toward the bottom of the lower portion 72 than towards the top 76. In other embodiments, other physical differences between the adsorption particles 160 and the catalyst particles 162 may facilitate physical separation in the reactor-adsorber 56. For example, in certain embodiments, the density of the catalyst particles 162 may be greater than the density of the $CO_2$ adsorption particles 160. For example, a ratio of the density of the catalyst particles 162 to the density of the $CO_2$ adsorption particles 160 may be between approximately 1.1:1 to 1000:1, 10:1 to 100:1, or 25:1 to 75:1. Thus, the denser catalyst particles 162 may be less likely to be carried toward the catalyst return cyclone 92 than the less dense $CO_2$ adsorption particles 160. In further embodiments, the catalyst particles 162 may be both larger and denser than the $CO_2$ adsorption particles 160. In some embodiments, the catalyst particles 162 may have a lower drag coefficient than the $CO_2$ adsorption particles 160.

As discussed above, the catalyst particles 162 may catalyze a water gas shift reaction of the raw syngas stream 66 to generate the hydrogen-rich gas 102. In certain embodiments, the catalyst particles 162 may include metals such as, but not limited to, cobalt, molybdenum, copper, zinc, iron, chromium, nickel, cerium, gold, platinum, ruthenium, iridium, and so forth. Specifically, the water gas shift reaction may be represented via the following reaction:

(EQUATION 2)

in which $H_2O$ represents water, CO represents carbon monoxide, $H_2$ represents hydrogen, and $CO_2$ represents carbon dioxide. As discussed above, the raw syngas stream 66 may include $H_2O$ and CO. Thus, the catalyst particles 162 help increase the amount of $H_2$ and $CO_2$ in the reacted syngas stream by accelerating the reaction of $H_2O$ and CO to produce $H_2$ and $CO_2$. In this process, heat is generated, which may be removed using the heat exchanger 78 shown in FIG. 2. The amount of heat removed by the heat exchanger 78 may be adjusted to optimize the kinetics and thermodynamics of the water gas shift reaction. Although the catalyst may accelerate the rate at which the water gas shift reaction proceeds, it cannot affect its equilibrium state, that is, it cannot affect the degree to which the reaction proceeds to the right of Equation 2. However, if one of the products of the reaction is continuously and completely removed from the reaction system, the water gas shift reaction will proceed completely to the right of Equation 2. That means that all of the $H_2O$ and CO will react to form $H_2$ and $CO_2$. Continuous removal of CO2 from the reaction system is accomplished by the $CO_2$ adsorption particles. As the $CO_2$ adsorption particles 160 remove $CO_2$ from the reacted syngas, the water gas shift reaction proceeds to the right of Equation 2 to produce additional $CO_2$ according to the Law of Mass Action. Thus, additional $H_2O$ and CO is converted into $H_2$ and $CO_2$ as the $CO_2$ is removed by the $CO_2$ adsorption particles 160. In addition, as with all catalysts, the catalyst particles 162 are not consumed by the water gas shift reaction and, thus, have no need to be regenerated. Therefore, the configuration of the reactor-adsorber 56 and the relative physical differences between the catalyst particles 162 and the $CO_2$ adsorption particles 160 discussed above enables the catalyst particles 162 to be retained in the fluidized bed 70. In contrast, the $CO_2$ adsorption particles 160 are not a catalyst and require regeneration, e.g., regeneration outside the reactor-adsorber 56, to maintain their effectiveness. Thus, the configuration of the reactor-adsorber 56 and the relative physical differences between the catalyst particles 162 and the $CO_2$ adsorption particles 160 enables a portion of the $CO_2$ adsorption particles 160 to continuously leave the fluidized bed and enter the catalyst return cyclone 92 to be transported to the regeneration system 54. In other words, the fluidized bed 70 both retains the catalyst particles 162 and enables the $CO_2$ adsorption particles 160 to continuously enter, circulate through, and leave the fluidized bed 70, thereby simplifying and reducing the cost of the reactor-adsorber 56. Further, the fluidized bed 70 is continuously replenished with the regenerated $CO_2$ adsorption particles 140 from the regeneration system 54 as shown in FIG. 2. Thus, the reactor-adsorber 56 is not shutdown or taken out of service to regenerate the $CO_2$ adsorption particles 160, thereby increasing the operational runtime and efficiency of the plant (e.g., IGCC power plant).

In other words, the hydrogen and $CO_2$ generation system 50 is a continuous process, and not a batch process.

Figure 4:
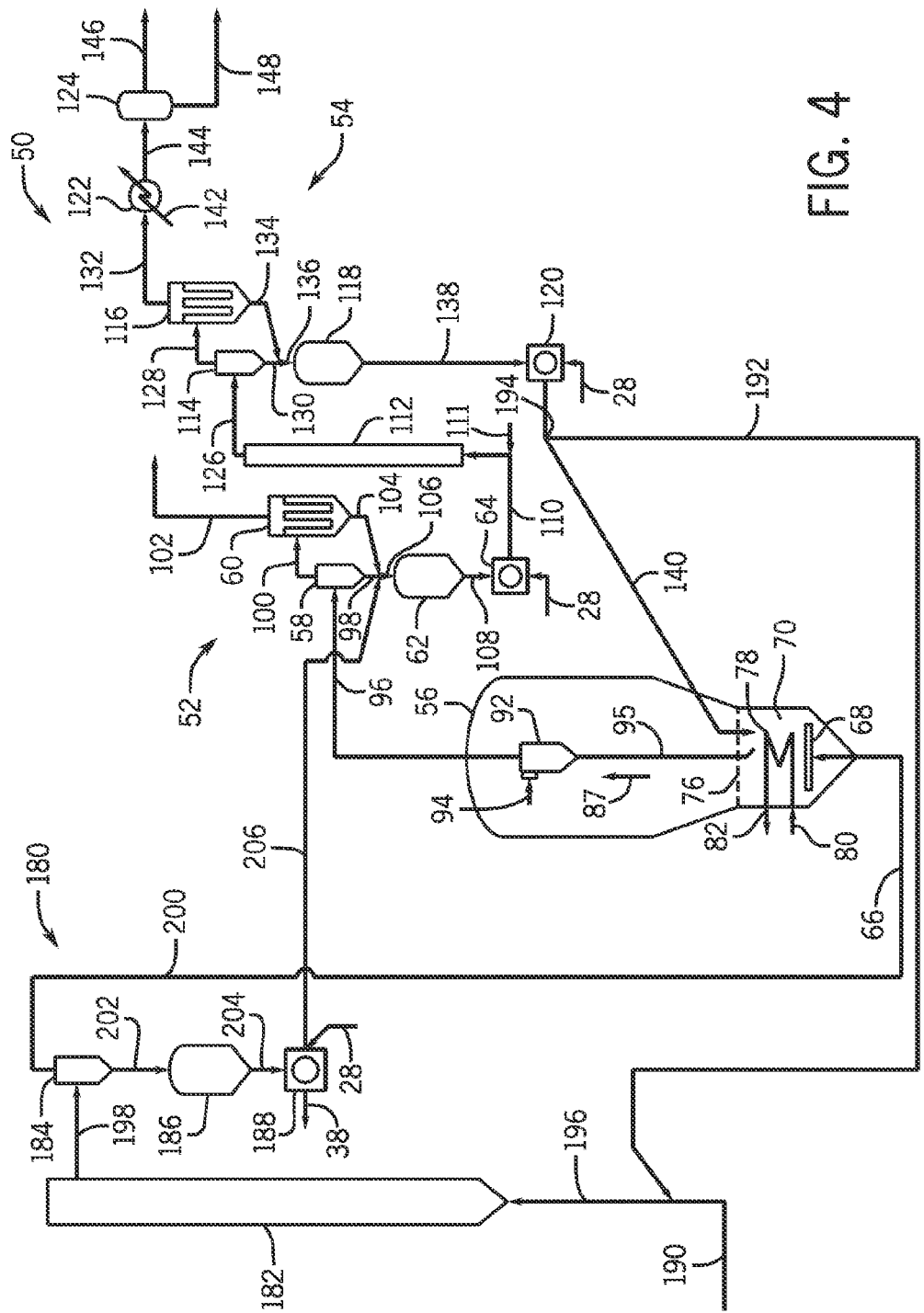
FIG. 4 is a schematic diagram of an embodiment of a combined water gas shift-$CO_2$ capture and pressurization system that includes a pre-adsorber.

FIG. 4 is a schematic diagram of an embodiment of the hydrogen and $CO_2$ generation system 50 that includes a pre-adsorber system 180. In such an embodiment, the pre-absorption system 180 is used to remove the $CO_2$ from the raw syngas 66 prior to introduction into the reactor-adsorber 56. Elements in FIG. 4 in common with those shown in FIG. 2 are labeled with the same reference numerals. The pre-absorption system 180 includes a pre-adsorber 182, a cyclone 184, an accumulator 186, and a third solids pressurizing feeder 188. The pre-adsorber 182 may be a transport reactor that uses $CO_2$ adsorption particles to adsorb $CO_2$ from the raw syngas 190, which may be generated by the gasifier of the plant (e.g., IGCC power plant). Alternatively, the pre-adsorber 182 may be any other kind of fluidized bed reactor. As shown in FIG. 4, the raw syngas stream 190 combines with a portion 192 of the regenerated $CO_2$ adsorption particles from the second solids pressurizing feeder 120. Specifically, the portion 192 of the regenerated $CO_2$ adsorption particles may be separated from the regenerated $CO_2$ adsorption particles 140 at a separation point 194. Various separation devices such as, but not limited to, tees, valves, and so forth, may be use at the separation point 194. A pre-adsorber feed mixture 196 of the raw syngas 190 and the portion 192 of the regenerated $CO_2$ adsorption particles then enters the pre-adsorber 182 where the $CO_2$ adsorption particles adsorb $CO_2$ from the pre-adsorber feed mixture 196.

A $CO_2$-lean syngas stream 198 from the pre-adsorber 182 then enters the cyclone 184, which separates solids from gases. In the cyclone 184, the saturated $CO_2$ adsorption particles are separated from the $CO_2$-lean syngas stream 198 through vortex separation. In other embodiments, the cyclone 184 may utilize other methods of gas-solid separation. Saturated $CO_2$ adsorption particles 202 exit the bottom of the cyclone 184 and a cyclone outlet stream 200 exits the top or side of the cyclone 184. The cyclone outlet stream 200 is $CO_2$-lean syngas and may then be directed to the reactor-adsorber 56 to be shifted to a hydrogen-rich gas. The saturated $CO_2$ adsorption particles 202 from the bottom of the cyclone 184 enter the accumulator 186. The accumulator 186 may be a vessel used to provide hold up capacity for the saturated $CO_2$ adsorption particles 202 being fed to the third solids pressurizing feeder 188. In other words, the accumulator 186 stores the saturated $CO_2$ adsorption particles 202 to enable a continuous saturated $CO_2$ adsorption particles stream 204 to be fed to the third solids pressurizing feeder 188 despite fluctuations of the saturated $CO_2$ adsorption particles 202 stream. In certain embodiments, the accumulator 186 may include a purge gas located near the bottom of the accumulator 186 to fluidize the saturated $CO_2$ adsorption particles 202 to help with stripping of any remaining gases. For example, the purge gas may be an inert gas, such as nitrogen. The third solids pressurizing feeder 188 may include the inert buffer gas 28, as described in detail below. The third solids pressurizing feeder 188 then conveys the saturated $CO_2$ adsorption particles 206 to the accumulator 62 of the reaction system 52. By removing the $CO_2$ from the raw syngas 190 prior to the reactor-adsorber 56, the overall size of the equipment in the reaction system 52 may be reduced, thereby reducing the cost of the equipment.

Figure 5:
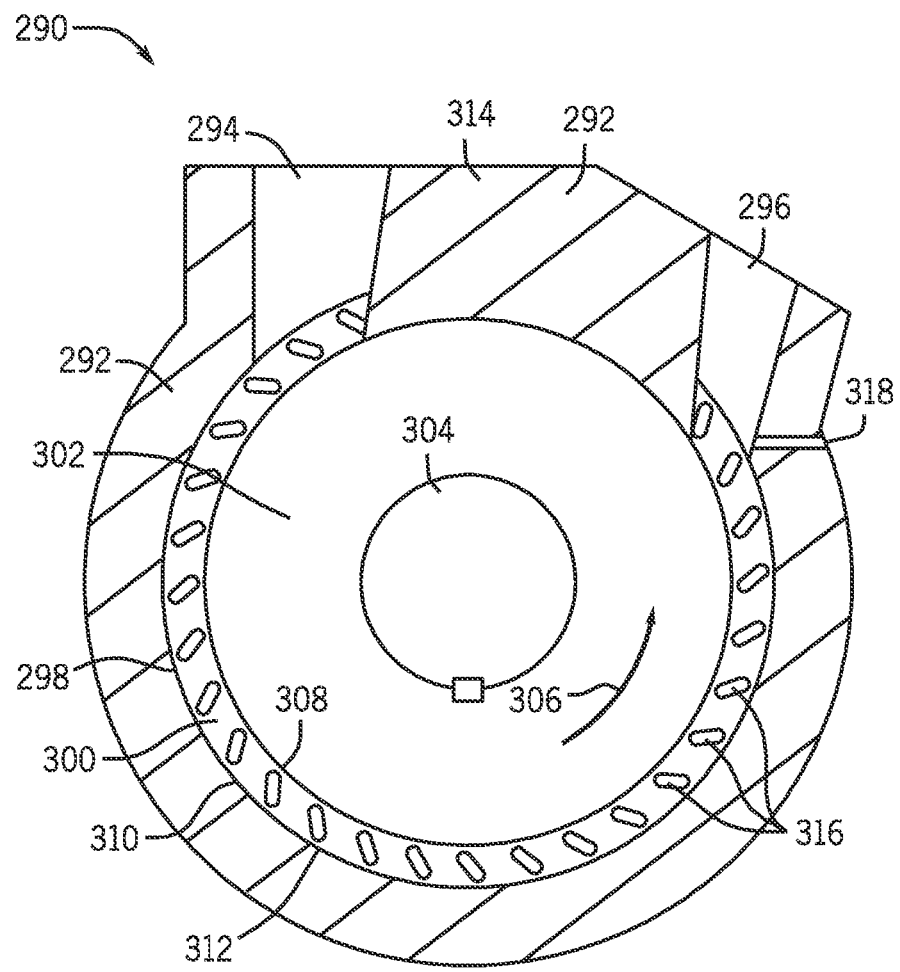
FIG. 5 is a cross-sectional side view of an embodiment of a rotary disk type pressurizing feeder that may be used in the systems of FIGS. 1, 2, and 4.

FIG. 5 is a cross-sectional side view of an embodiment of a rotary disk type pressurizing feeder 290 that may be used in the systems of FIGS. 1, 2, and 4, illustrating operational features of the positive displacement feeder 290. The rotary disk type pressurizing feeder 290 may be a Posimetric® Feeder made by General Electric Company of Schenectady, N.Y. As shown in FIG. 5, the rotary disk type pressurizing feeder 290 includes a housing 292, inlet 294, outlet 296, and rotor 298. The rotor 298 may include two substantially opposed and parallel rotary discs 300, separated by a hub 302 and joined to a shaft 304 that is common to the parallel disks 300 and the hub 302. Note that, in FIG. 5, the two disks 300 are not in the plane of the page, as are the rest of the elements in the figure. One of the disks 300 is below the plane of the page, and the other disk 300 is above the plane. The disk 300 below the plane is projected onto the plane of the page in order that it may be seen in relation to the rest of the components comprising the disk type solids pressurizing feeder 290. The outer convex surface 308 of the hub 302, the annularly shaped portion of the two disks 300 that extend between the outer surface of the hub 308 and the peripheral edge 310 of the disks 300, and the inner, concave surface 312 of the feeder housing 292 define an annularly shaped, rotating channel that connects the converging inlet channel 294 and the diverging outlet channel 296. A portion 314 of the feeder body 292 that is disposed between the inlet channel 294 and the outlet channel 296 divides the rotating channel in such a way that solids entering the inlet channel 294 may travel only in the direction of rotation 306 of the rotor, so that the solids may be carried from the inlet channel 294 to the outlet channel 296 by means of the rotating, annularly shaped channel defined by the rotating outer surface of the hub 308, the rotating exposed annular surfaces of the disks 300 and the stationary inner surface 312 of the body 292.

As solids enter and move downwards through the converging inlet channel 294, the particles progressively compact. As the particles continue to be drawn downwards and into the rotating channel, the compaction may reach a point where the particles become interlocked and form a bridge across the entire cross-section of the channel. As the compacted particles continue to move through the rotating channel in the direction of rotation 306, the length of the zone containing particles which have formed an interlocking bridge across the entire cross-section of the rotating channel may become long enough that the force required to dislodge the bridged particles from the channel exceeds the force that may be generated by the high pressure environment at the outlet of the feeder 290. This condition, where the interlocking solids within the rotating channel cannot be dislodged by the high pressure at the outlet of the feeder 290, is called "lockup". By achieving the condition of lockup, the torque delivered by the shaft 304 from the drive motor (not shown) may be transferred to the rotating solids so that the solids are driven from the inlet channel 294 to the outlet channel 296 against whatever pressure exists in the high-pressure environment beyond the exit of the outlet channel 296. In some embodiments, the rotor disks 300 may have raised or depressed surface features 316 formed onto their surfaces. These features may enhance the ability of the particulate solids to achieve lockup in the rotating channel and, therefore, may also enhance the ability of the drive shaft 304 to transfer torque to the rotating solids. In another embodiment, a live wall hopper (not shown in any of the previous figures) may be attached immediately upstream of the inlet channel 294 of the feeder 290. The live wall hopper may enhance the ability of the particulate solids to flow into and completely fill the inlet channel 294. So, for example, in FIG. 2, a live wall hopper may be inserted between accumulator 62 and solids pressurizing feeder 64. As the particles in the rotating channel reach the outlet channel 296, they encounter the diverging walls of the outlet channel 296.

As the particles move through the diverging outlet channel 296, the forces that held them in the lockup condition begin to relax to the point where, at the downstream exit of the outlet channel 296, the particles are able to freely disengage from the outlet channel 296 and proceed downstream. However, at the upstream entrance to the diverging outlet channel 296, the solids may be subjected upstream to the force of the constantly advancing solids that are locked up and being driven forward by the rotor and downstream to the high-pressure environment into which the solids are being transported. Under these compressive forces from both upstream and downstream, the solids in the upstream entrance to the outlet channel 296 may compact even further and may form a dynamic, packed bed that is highly resistant to the backflow of fluids (gases or liquids) from the high-pressure environment at the discharge of the feeder 290. It is this zone of highly packed, flow resistant particulate solids that may prevent significant backflow of fluids from the high-pressure outlet of the low-pressure inlet of the pump 290. Of course this highly packed, flow resistant zone may be an imperfect seal, and some fluid may leak backwards through the tightly packed solids at the upstream entrance of the outlet channel 296. However, the amount of backflow may be small, and the small amount of fluid that may work its way through the tightly packed solids may be collected in a vent 318 and, thus, may be prevented from flowing backwards all the way to the feeder inlet. The small amount of fluid (gases or liquids) that may be collected in the vent 318 may either be disposed of or, preferably, recycled to an appropriate location elsewhere in the process. As a result of the dynamic packed bed at the entrance of the outlet channel 296 that is highly resistant to fluid backflow and as a further result of collecting the small amount of fluid that may work its way back through the dynamic packed bed, the rotary disk type solids pressurizing feeder 290 may function as a means to separate two reactors having widely differing pressures and significantly different chemical compositions.

The operation of the rotary disk type solids pressurizing feeder 290 shown in FIG. 5 was explained above for an embodiment in which the rotation of the annularly shaped channel was from the inlet channel 294, which is at lower pressure, to the outlet channel 296, which is at higher pressure. Such an application may be called "pressurizing mode." However, the rotation of the disks, and hence of the annularly shaped channel, may be reversed so that the direction of rotation runs from the higher-pressure outlet channel 296 to the lower pressure inlet channel 294. When this is done, along with some appropriate modifications to the geometries of the inlet and outlet channels, the rotating disk type solids feeder 290 works as a solids depressurizing feeder. Such an embodiment may be called "depressurizing mode." When operating in depressurizing mode, the solid particulates from a high-pressure zone enter what was called the outlet channel 296 in FIG. 5. As they progress downwards through the outlet channel, they move through the dynamic, highly compacted zone at the bottom of the outlet channel 296 that forms the highly flow resistant zone that prevents unwanted backflow from the high-pressure region at the outlet channel 206 to the low-pressure region at the inlet channel 294. As the annularly shaped channel continues to rotate in the opposite direction from what is shown in FIG. 5, the solids are carried back to the inlet channel 294 where the locking forces that held them in place inside the rotating channel relax and allow the solids to disengage from one another as they exit the inlet channel 294 on the low-pressure side of the feeder. Note that, for every application in which a lower pressure reactor vessel is coupled together with a higher pressure reactor vessel, at least one solids pressurizing feeder 16 operating in pressurizing mode and one solids pressurizing feeder 16 operating in depressurizing mode is required. For the case where two vessels operating at essentially the same pressure are coupled using two solids pressurizing feeders 16, the feeders may both operate in the pressurizing mode. However, in such an application, the differential pressure developed by each of the feeders is only that which is required to overcome the pressure losses in the conduits connecting the vessels in the system. In another embodiment in which two reactor vessels are coupled and in which the second vessel is at a higher pressure, a single solids pressurizing feeder 16 may be used to transport the solids from the lower pressure vessel to the higher pressure vessel while a conventional solids handling valve may be used to depressured the solids from the higher pressure vessel to the lower pressure vessel.

Figure 6:
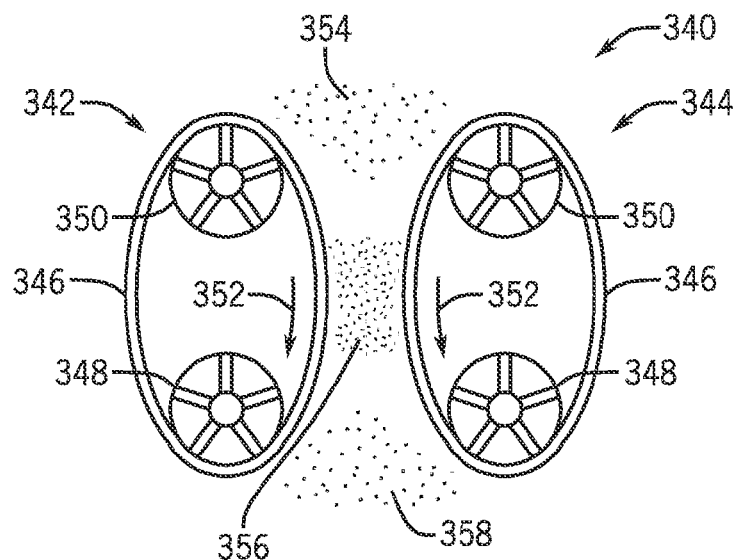
FIG. 6 is a cross-sectional side view of an embodiment of a double-track feeder that may be used in the systems of FIGS. 1, 2, and 4.

FIG. 6 is a cross-sectional side view of an embodiment of a double-track feeder 340, which may also be used as the solids pressurizing feeder in any of the systems of FIGS. 1, 2, and 4. As shown in FIG. 6, the double-track feeder 340 includes a first conveyor system 342 and second conveyor system 344. Both the first and second conveyor systems 342 and 344 include a conveyor belt 346 disposed about a first wheel 348 and a second wheel 350. Rotation of the first and second wheels 348 and 350 may cause rotation of the conveyor belt 346 in the direction of the arrow 352. The two conveyor belts 346 are constructed with mechanical features that are not shown because they are out of the plane of the figure, which allow the two belts to interlock in such a manner that they form an entirely enclosed solids transporting channel between them that continuously interlocks as the two belts approach each other at the entrance of the feeder 354 and continuously unlocks as the two belts retreat from each other at the exit of the feeder 358. Also not shown in FIG. 6 are the details of the feeder body and the means by which the moving conveyor belts are sealed within the body so that gases cannot move from the exit to the inlet of the feeder along the sides of the conveyor belts 346 that face away from the solids being conveyed. Solids to be conveyed by the double-track feeder 340 enter at an entrance 354 and are moved by the motion 352 of the conveyor belts 346. As shown in FIG. 6, the passage through which the solids are conveyed narrows near a throat 356 of the double-track feeder 340. Thus, the solids are compacted in the throat 356 of the double-track feeder 340. Such compaction of the solids in the throat 356 may correspond to the solids lockup condition and/or the dynamic, backflow resistant, highly compacted solids region created by the upstream end of the outlet channel 296 by the rotary disk type pressurizing feeder 290. The solids emerge at an exit 358 of the double-track feeder 340. As with the design of the rotary disk type pressurizing feeder 290, the double-track feeder 340 helps to reduce or prevent the backflow of any gases through the double-track feeder 340, because of the solids lockup condition and/or the backflow resistant, highly compacted solids region at the throat 356. A vent (not shown) may also be used to capture the small amount of gas which may leak through the compacted solids, as with the rotary disk type pressurizing feeder 290. In addition, the double-track feeder 340 may include the inert buffer gas 28 to provide an additional barrier to intermixing of gases. Further, the operating pressures at the exit 358 and the entrance 354 may be substantially different from one another. Thus, the double-track feeder 340 may be particularly well suited to be used as one of the various pressurizing feeders in the systems of FIGS. 1, 2, and 4.

Figure 7:
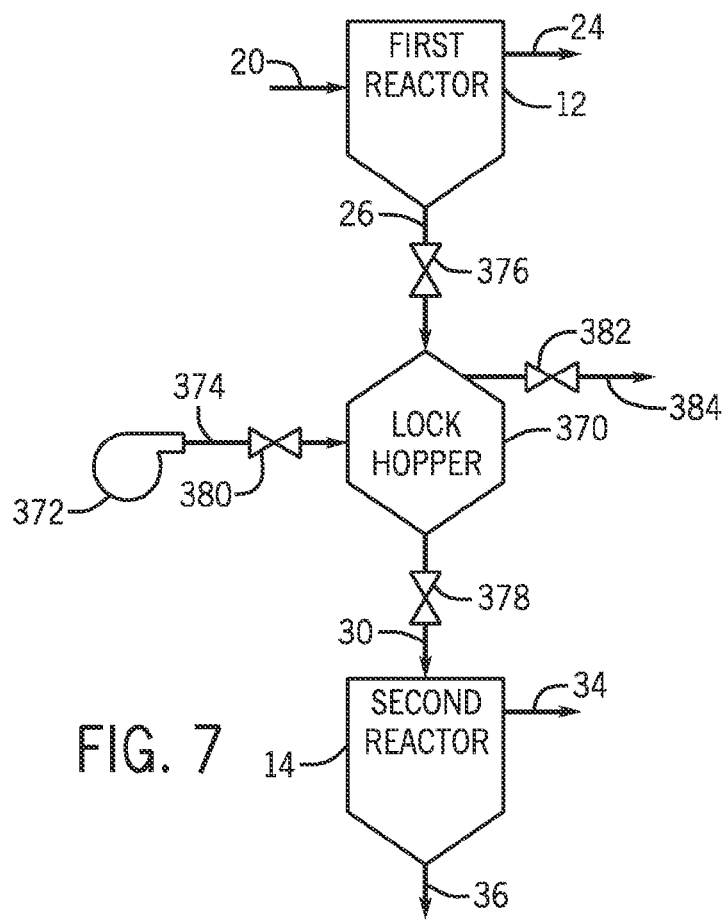
FIG. 7 is a schematic diagram of an embodiment of a lock hopper that may be used in the systems of FIGS. 1, 2, and 4.

FIG. 7 is a cross-sectional side view of an embodiment of a lock hopper 370, which may also be used as one of the various pressurizing feeders in the systems of FIGS. 1, 2, and 4. As shown in FIG. 7, the lock hopper 370 is disposed between the first reactor 12 and the second reactor 14. A compressor 372 is coupled to the lock hopper 370 to provide a source of compressed gas 374, which may also be used as the inert buffer gas 28, in addition to providing the source of pressure for the system. Depending upon the particular process in which the lock hopper 370 is used, the compressed gas 374 may include, but is not limited to, air, argon, nitrogen, or any gas that is compatible with the process in which it is being used. During operation of the lock hopper 370, all valves in the system start in the closed position. Then, a first lock hopper valve 376 is opened to allow the first solids stream 26 to enter the lock hopper 370. The first lock hopper valve 376 is closed once the lock hopper 370 reaches a certain level or amount of the first solids stream 26. Then, first block valve 380 is opened and blower 372 is operated to increase the pressure of the lock hopper 370 using the compressed gas 374. In addition, the second block valve 382 may also be opened temporarily to allow the compressed gas 374 to be used to purge any gas from the first reactor 12 from the lock hopper 370 via vent line 384. Once the pressure inside the lock hopper 370 has reached a suitable value, the first block valve 380 is closed, the compressor 374 is stopped and the second lock hopper valve 378 is opened to enable the first solids stream to exit from the lock hopper 370 into the second reactor 14. In certain embodiments, the compressor 372 may remain on and the first block valve 380 may remain open during this process. After the lock hopper 370 is emptied, the second lock hopper valve 378 is closed and the pressure inside the lock hopper 370 is vented via the second block valve 382 and the vent line 384 until the pressure inside the lock hopper once again equals the pressure of the first reactor 12. During this venting process, any gas from the second reactor 14 that may have flowed backwards into lock hopper 370 during the transfer of the second solids stream 30 from the lock hopper 370 to the second reactor 14 may be purged from the lock hopper 370 using the compressor 372 and the vent line 384. Once purging is completed, the compressor is turned off and all valves are closed. At this point, the first lock hopper valve 376 may be opened and the process repeated. Thus, the lock hopper 370 may be used to convey solids when the operating pressure of the second reactor 14 is greater than the operating pressure of the first reactor 12. In other words, a lock hopper system that includes the lock hopper 370, compressor 372, first lock hopper valve 376, second lock hopper valve 378, and first and second block valves 380 and 382 isolates the first reactor 12 from the second reactor 14 during the conveying process. This isolation enables the pressures of the first and second reactors 12 and 14 to be substantially different from one another. In addition, by venting any gases from the second reactor 14 prior to filling the lock hopper 370 from the first reactor 12, any intermixing of gases from the first and second reactors 12 and 14 may be avoided. Thus, the lock hopper system is another example of one of the various pressurizing feeders in the systems of FIGS. 1, 2, and 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a reactor-adsorber configured to receive a gas, wherein the reactor-adsorber comprises a catalyst material configured to catalyze a water gas shift reaction of the gas to generate a hydrogen-rich gas, and a carbon dioxide ($CO_2$) adsorption material configured to adsorb $CO_2$ from the hydrogen-rich gas to generate a saturated $CO_2$ adsorption material;
 a regenerator configured to receive the saturated $CO_2$ adsorption material from the reactor-adsorber, wherein the regenerator is configured to regenerate the saturated $CO_2$ adsorption material to provide a regenerated $CO_2$ adsorption material and $CO_2$;
 a first solids pressurizing feeder configured to convey the saturated $CO_2$ adsorption material from the reactor-adsorber to the regenerator; and
 a second solids pressurizing feeder configured to convey the regenerated $CO_2$ adsorption material from the regenerator to the reactor-adsorber, wherein the first and second solids pressurizing feeders are configured to at least substantially reduce or prevent fluid flow between the reactor-adsorber and the regenerator.

2. The system of claim 1, wherein the catalyst material and the $CO_2$ adsorption material comprise catalyst particles and $CO_2$ absorption particles disposed in a fluidized bed of the reactor-adsorber.

3. The system of claim 2, wherein the fluidized bed comprises a heat exchanger configured to remove heat from the fluidized bed.

4. The system of claim 2, wherein the reactor-adsorber comprises an expanding cross-sectional area in a direction of flow through an interior chamber, the expanding cross-sectional area is configured to reduce a velocity of the flow to a level insufficient to carry catalyst particles and sufficient to carry saturated $CO_2$ adsorption particles out of the reactor-adsorber.

5. The system of claim 2, wherein a first density of the catalyst particles is greater than a second density of the $CO_2$ adsorption particles, a first diameter of the catalyst particles is greater than a second diameter of the $CO_2$ adsorption particles, a first drag coefficient of the catalyst particles is less than a second drag coefficient of the $CO_2$ adsorption particles, or any combination thereof.

6. The system of claim 1, wherein the reactor-adsorber is configured to operate at a first pressure, the regenerator is configured to operate at a second pressure, and the first and second solids pressurizing feeders at least substantially reduce or prevent fluid flow between the reactor-adsorber and the regenerator such that the first pressure is different from the second pressure.

7. The system of claim 6, wherein a ratio of the second pressure to the first pressure is greater than approximately 2:1.

8. The system of claim 6, wherein a ratio of the second pressure to the first pressure is less than approximately 0.5:1.

9. The system of claim 1, wherein the regenerator provides the $CO_2$ at a pressure greater than approximately 2,800 kilopascals.

10. The system of claim 1, comprising a pre-adsorber configured to receive the gas, wherein the pre-adsorber is configured to use the $CO_2$ adsorption material to adsorb $CO_2$ from the gas to generate a $CO_2$-lean gas that is conveyed to the reactor-adsorber as the gas.

11. The system of claim 1, wherein the first and second solids pressurizing feeders comprise rotary disk type pressurizing feeders, double-track feeders, lock hoppers, or a combination thereof.

12. The system of claim 1, wherein the reactor-adsorber comprises a first separation system configured to separate the saturated $CO_2$ adsorption material from the hydrogen-rich gas, and the regenerator comprises a second separation system configured to separate the regenerated $CO_2$ adsorption material from the $CO_2$.

13. The system of claim 12, wherein the first separation system is disposed in an interior of the reactor-adsorber.

14. A system, comprising:
 a first reactor configured to receive a first gaseous stream and generate a first solids stream, wherein the first reactor comprises a fluidized bed of catalyst particles and adsorption particles, the first solids stream comprises a portion of the adsorption particles, and the first reactor is configured to substantially retain the catalyst particles;
 a second reactor configured to receive the first solids stream, receive a second gaseous stream, and generate a second solids stream;
 a first solids pressurizing feeder configured to convey the first solids stream from the first reactor to the second reactor; and
 a second solids pressurizing feeder configured to convey the second solids stream from the second reactor to the first reactor, wherein the first and second solids pressurizing feeders are configured to at least substantially reduce or prevent fluid flow between the first reactor and the second reactor.

15. The system of claim 14, wherein the first reactor comprises an expanding cross-sectional area in a direction of flow through an interior chamber, the expanding cross-sectional area is configured to reduce a velocity of the flow to a level insufficient to carry the catalyst particles and sufficient to carry the portion of the adsorption particles out of the first reactor.

16. The system of claim 15, wherein a first density of the catalyst particles is greater than a second density of the adsorption particles, a first diameter of the catalyst particles is greater than a second diameter of the adsorption particles, a first drag coefficient of the catalyst particles is less than a second drag coefficient of the adsorption particles, or any combination thereof.

17. The system of claim 14, wherein the fluidized bed comprises a heat exchanger configured to remove heat from the fluidized bed.

18. A system, comprising:
 a reactor configured to receive a gaseous stream and generate a solids stream, wherein the reactor comprises a fluidized bed of catalyst particles and adsorption particles, the solids stream comprises a portion of the adsorption particles, the reactor is configured to substantially retain the catalyst particles, and the catalyst particles are configured to catalyze a water gas shift reaction of the gaseous stream to generate a hydrogen-rich gas; and
 a solids pressurizing feeder configured to convey the solids stream away from the reactor.

19. The system of claim 18, wherein the reactor comprises an expanding cross-sectional area in a direction of flow through an interior chamber, the expanding cross-sectional area is configured to reduce a velocity of the flow to a level insufficient to carry the catalyst particles and sufficient to carry the portion of the adsorption particles out of the reactor.

20. The system of claim 18, wherein a first density of the catalyst particles is greater than a second density of the adsorption particles, a first diameter of the catalyst particles is greater than a second diameter of the adsorption particles, a first drag coefficient of the catalyst particles is less than a second drag coefficient of the adsorption particles, or any combination thereof.

21. The system of claim 18, wherein the solids pressurizing feeder comprises a rotatable component configured to convey the solids stream away from the reactor via rotation of the rotatable component.

* * * * *